United States Patent [19]

Zarchy

[11] Patent Number: 4,547,292
[45] Date of Patent: Oct. 15, 1985

[54] SUPERCRITICAL FLUID EXTRACTION AND ENHANCEMENT FOR LIQUID LIQUID EXTRACTION PROCESSES

[75] Inventor: Andrew S. Zarchy, Amawalk, N.Y.

[73] Assignee: General Electric Company, Schenectady, N.Y.

[21] Appl. No.: 547,274

[22] Filed: Oct. 31, 1983

[51] Int. Cl.[4] .............................................. B01D 11/04
[52] U.S. Cl. .................................... 210/634; 208/309; 210/806
[58] Field of Search ............. 203/49; 208/208 R, 309; 210/511, 634, 805, 806, 774

[56] References Cited

U.S. PATENT DOCUMENTS

| | | | |
|---|---|---|---|
| 3,969,196 | 7/1976 | Zosel | 203/49 |
| 4,125,459 | 11/1978 | Garwin | 208/309 |
| 4,191,639 | 3/1980 | Audeh et al. | 208/309 |
| 4,349,415 | 9/1982 | De Filippi et al. | 210/634 |
| 4,354,928 | 10/1982 | Audeh et al. | 208/309 |
| 4,358,365 | 11/1982 | Hutchings et al. | 208/96 |
| 4,375,387 | 3/1983 | De Filippi et al. | 210/511 |

Primary Examiner—Richard V. Fisher
Assistant Examiner—W. Gary Jones
Attorney, Agent, or Firm—Lawrence D. Cutter; James C. Davis, Jr.; Marvin Snyder

[57] ABSTRACT

Liquid-liquid extraction processes employing a liquid solvent are enhanced through the utilization of a subsequent supercritical fluid extraction process performed on the liquid extract from the liquid-liquid process. The second, supercritical solvent is used in the supercritical fluid extraction process step. The extract from the supercritical fluid extraction process is further processed to separate the supercritical solvent and the liquid solvent, both of which are returned in a closed cycle flow to the supercritical fluid extraction vessel and the liquid-liquid reaction vessel respectively.

10 Claims, 1 Drawing Figure

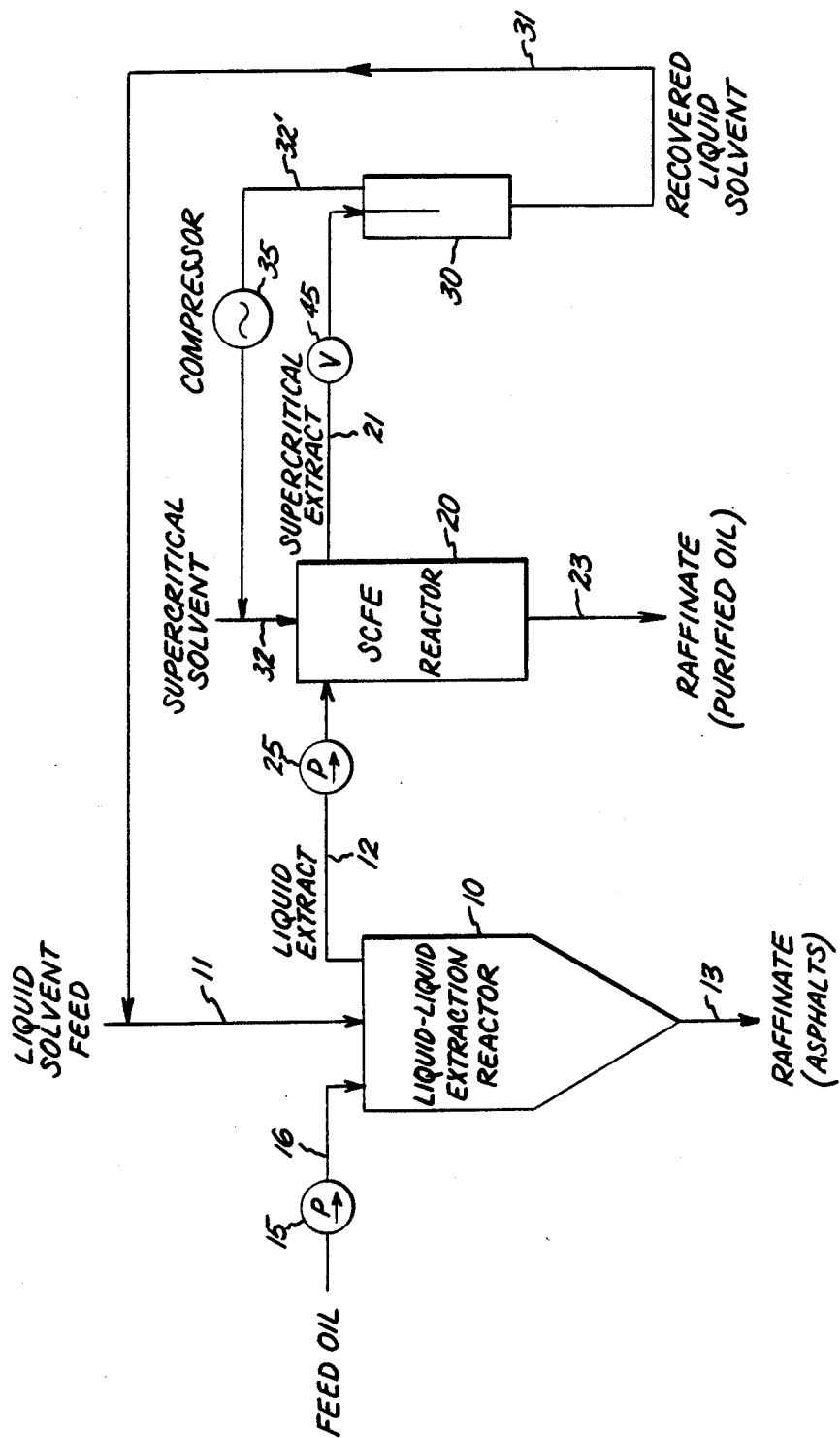

SUPERCRITICAL FLUID EXTRACTION AND ENHANCEMENT FOR LIQUID LIQUID EXTRACTION PROCESSES

BACKGROUND OF THE INVENTION

The present invention relates to the enhancement of liquid-liquid extraction processes. More particularly, the present invention relates to the utilization of super critical fluid extraction to further process the liquid extract from a liquid-liquid separation process. Further processing is also provided in which the liquid solvent and the supercritical solvent are separated and recirculated to their respective reaction vessels.

Liquid-liquid separation processes are characterized in that a liquid solvent is added to various feed stocks which include mixtures of various compounds. The liquid solvent is selected to dissolve certain components of feedstock. The liquid-liquid extraction process results in the production of a liquid extract which has dissolved therein certain components of the feedstock. The component of the feedstock which is left following removal of the liquid extract is referred to as the raffinate. The material that is usually the desired product of this process is typically found in the liquid extract. The task then becomes one of separating the liquid solvent from the components which are dissolved therein. Typically this separation is carried out through processes such as distillation. However, such processes are typically not energy efficient particularly since the thermal energy which is applied to the liquid extract to boil off the liquid solvent is typically not required. In accordance with the present invention the relatively energy inefficient distillation separation of the liquid extract from its solute is performed by supercritical fluid extraction employing a supercritical solvent, such as carbon dioxide. Such a solvent has a particular advantage that it is relatively easily separated from the liquid solvent thereby rendering it possible to return both the supercritical solvent and the liquid solvent to their respective reaction vessels. While the present invention is generally applicable to enhancement of any liquid-liquid separation process, it is particularly described herein with respect to a treatment of residual oil which is effective for the removal of vanadium compounds.

In order to fully appreciate the residual oil treatment process described herein, it is desirable to consider some of the properties of this particular feedstock. In particular, residual oil is the oil that remains after crude oil is distilled. Residual oil is, however, not a uniquely characterizable fuel. The composition of the residual oil is a function of both the crude oil from which is was made and the conditions under which it was processed. Moreover, determination of the chemical composition of the given residual oil is a difficult task, since it is composed of a wide spectrum of compounds. To avoid this problem it is common in the petroleum industry to describe oil fractions by operational definitions. For example, the various fractions obtained in distillation are described by the "still" temperature at which they were drawn. The still temperature is also referred to as the "cut" temperature. Similarly, the various fractions of residual oil are described by their solubility in known solvents. In particular, the asphaltenes are those compounds which are not soluble in pentane.

In particular, residual oil is known to contain quantities of vanadium, which is deleterious to gas turbine power plants employing such residual oil as a fuel. The vanadium is chemically bound in some of the organic molecules in the residual oil, thus is soluble in the oil. Typically, 50% of the vanadium is incorporated into the oil as a porphyrnic structure. The basic porphyrnic structure has a molecular weight of approximately 400, and can exist as a monomer or polymer, or be associated with other forms, and thus can grow into very large structures. Similarly, the non-porphyrnic forms of vanadium span a wide range of molecular weights. It is noted that about 70% of the vanadium is associated with asphaltenic elements in the residual oil. Such elements make up approximately 15% by weight of the oil. Accordingly, it is seen that deasphalting the residual oil with a yield of about 85% results in removal of about 70% of the undesired vanadium. Deasphalting the residual oil may be accomplished by distillation, or as proposed herein, by the utilization of energy efficient liquid-liquid extraction process.

The deleterious effects of vanadium in residual oil as a gas turbine fuel are mitigated by the utilization of magnesium injection. However, magnesium injection results in shorter than desirable maintenance periods. Additionally, it is noted that the magnesium injection required to mitigate the corrosive effects of the vanadium is directly proportional to the vanadium content in the residual oil field. It is therefore seen that one of the objects of the present invention is the removal of this vanadium from residual oil prior to its utilization as a fuel in gas turbine power plants, particularly those used for electrical energy generation. However, it is noted that the present invention is nonetheless applicable to a wide range of processes and feedstocks. In particular, the present invention is applicable to any liquid-liquid extraction process employing a solvent for which there is available a supercritical fluid solvent which may be readily separated from the liquid solvent.

Supercritical fluid extraction (SCFE) is a chemical engineering unit operation whose applications are growing rapidly. As the name implies, supercritical fluid extraction is an extraction process in which a fluid above its critical point is used as the solvent. Accordingly, SCFE is in a sense a hybrid between liquid extraction and distillation in that the fluid has the flow properties of a gas and yet the solvent properties of a liquid. Although the principles of SCFE have been known for over 100 years, the operation has only recently begun to elicit interest as its advantages have only recently been recognized. Some of these advantages are that supercritical fluid extraction is energy efficient, selective, runs at a relatively low temperature and can exhibit a larger solubility difference over a narrower range of conditions, than either distillation or liquid-liquid extraction. SCFE has in fact also been used for deasphalting oils.

SUMMARY OF THE INVENTION

In accordance with a preferred embodiment of the present invention a conventional liquid-liquid extraction process is enhanced through the utilization of a supercritical extraction process step which is employed to separate the solvents from the solute. In particular, with pentane, hexane, propane or butane employed a the liquid solvent for the treatment of residual oil feedstock, it is seen that carbon dioxide provides a highly desirable supercritical solvent particularly in that the liquid solvent and the supercritical solvent may thereafter be readily separated and recirculated through their respective reaction vessels. Accordingly, the process of the present invention is seen to be conservative of both energy and materials.

Accordingly, it is an object of the present invention to provide enhanced liquid-liquid extraction processes.

It is also an object of the present invention to improve the energy efficiency of liquid-liquid separation processes through the utilization of supercritical fluid extraction, rather than distillation processes or other processes.

It is a still further object of the present invention to provide a process for the removal of vanadium from residual oil, particularly so as to render the residual oil more suitable for utilization in gas turbine power plants. In general, it is seen that it is therefore an object of the present invention to provide enhanced extraction processes.

DESCRIPTION OF THE FIGURE

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

The FIGURE is a schematic flow diagram illustrating a preferred embodiment of the present invention.

DETAILED DESCRIPTION OF THE INVENTION

The FIGURE illustrates a preferred embodiment of the present invention. The flow diagram illustrated in the FIGURE is applicable to any liquid-liquid extraction reaction process. However, the labeling of the various feed streams is particularized to the process described above for the removal of vanadium from residual oil employed as the feedstock. While the description is provided in terms of this particular example, it should nonetheless be appreciated that the process described herein is applicable to a much wider range of extraction processes. In short, the example provided herein should not be considered as being limited thereto. It is applicable to any liquid-liquid extraction process in which a supercritical solvent is employable to remove the liquid solvent.

In the FIGURE it is seen that pump 15 supplies residual oil 16 to liquid-liquid extraction reaction vessel 10. Reaction vessel 10 is also provided with liquid solvent 11. As a result of the liquid-liquid extraction reaction in vessel 10, solutes from residual oil 16 are dissolved in the liquid solvent and are thereby removed from the residual oil. The liquid-liquid extraction reaction thereby produces liquid extract 12 and raffinate 13. In particular, organic solvents such as hexane, pentane, propane and butane do not particularly dissolve the asphaltene components of the residual oil. Thus, with these solvents and when the feedstock is residual oil, raffinate 13 is typically an asphaltene compound mixture. Liquid extract 12 comprises the liquid solvent together with various solutes, particularly the relatively more volatile vanidyl porphyrins. Liquid extract 12 is then supplied to supercritical fluid extraction (SCFE) reaction vessel 20 by means of pump 25. Also supplied to reactor vessel 20 is supercritical solvent 32. For the vanadium separation extraction process described herein and other liquid-liquid extraction processes involving organic solvents, the supercritical solvent preferably comprises a solvent such as carbon dioxide. The solvent reaction occurring in vessel 20 results in the formation of a solution comprising the supercritical solvent and the liquid solvent which together forming supercritical extract 21. Supercritical extract 21 is supplied through valve 45 to expansion vessel 30 for separation of the supercritical solvent. The removal of supercritical extract 21 leaves raffinate 23 which is removed from reaction vessel 20. In the particular process described, raffinate 23 comprises purified oil in the sense that vanadium containing asphaltene constituents are removed.

A particular advantage of the present process is that the supercritical fluid extraction reaction process provides an energy efficient and materially efficient process for the separation of the desired solute from the liquid solvent. In particular, in the case of organic liquid solvents and the use of carbon dioxide as the supercritical solvent, it is seen that it is relatively easy and efficient not only in the sense described, but also in the sense that the two solvents employed are readily returnable to their respective reaction vessels. In particular, it is seen that the supercritical extract 21 which is typically under pressure may be supplied to expansion tank 30 through valve 45 in which the carbon diode and liquid solvent are separated. The recovered liquid solvent 31 is thereby seen to be readily returnable to reaction vessel 10. Likewise, supercritical solvent 32' may be processed through compressor 35 and thereby returned to vessel 20 as a supercritical solvent at the appropriate temperature and pressure. For example, for carbon dioxide the preferable temperature is between about 90° F. and about 130° F. with the preferred pressure being between about 1075 psi and 8000 psi. In this fashion then, it is seen that the process illustrated in the FIGURE is essentially a closed cycle process in which the solvents are recirculated and conserved. Of course, makeup streams may be provided to replace any solvent which may be removed along with either raffinate 13 or 23.

From the above, it may be appreciated that the present invention provides an enhanced extraction process which is particularly applicable to any liquid-liquid separation method. In particular, it is seen that the solvents are recirculated in a closed loop system. It is seen also that it is no longer necessary to employ energy intensive distillation processes for the removal of the solvents from the dissolved solute. It is seen also that the supercritical fluid extraction process employed is also energy efficient, economical and highly selective with respect to liquid-solvent separation. In particular, it is seen that carbon dioxide is a particularly applicable fluid to employ for use in the supercritical extraction reaction vessel of the present process since it is readily removable from the liquid solvent. It is also seen that the particular process described above is particularly applicable to the separation of vanadium from residual oil so as to thereby render the residual oil much more useful for use as a fuel in gas turbine power plants.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A combined liquid-liquid and supercritical fluid extraction process comprising the steps of:
   supplying a feed solution suitable for liquid-liquid solvent extraction to a liquid-liquid extraction reaction vessel, said feed solution containing solute to be removed;
   supplying, to said liquid-liquid extraction reaction vessel, a liquid solvent capable of dissolving at least a portion of said solute in said feed solution, so as to form a first raffinate product and a first liquid extract product in said liquid-liquid extraction reaction vessel, said first liquid extract including at least a portion of said solute;
   supplying said liquid extract from said liquid-liquid extraction reaction vessel to a supercritical fluid extraction reaction vessel; and
   supplying a supercritical solvent to said supercritical fluid extraction reaction vessel so as to form a second raffinate and a supercritical extract.

2. The process of claim 1 in which said feed solution comprises residual oil.

3. The process of claim 1 in which said liquid solvent comprises a solvent from the group consisting of hexane, pentane, propane and butane.

4. The process of claim 1 in which said supercritical solvent comprises carbon dioxide.

5. The process of claim 4 in which said carbon dioxide is employed in said supercritical fluid extraction reaction vessel at a pressure between about 1075 and about 8000 psi and at a temperature between about 90° F. and about 130° F.

6. The process of claim 1 further including the step of removing said second raffinate from said supercritical fluid extraction reaction vessel.

7. The process of claim 1 further including the step of removing said first raffinate from said liquid-liquid extraction reaction vessel.

8. The process of claim 1 further including the step of supplying said supercritical extract to a separation reaction vessel in which said supercritical solvent and liquid solvent are substantially separated.

9. The process of claim 8 further including the step of recirculating said supercritical solvent from said separation reaction vessel to said supercritical fluid extraction reaction vessel.

10. The process of claim 8 further including the step of recirculating said liquid solvent from said separation reaction vessel to said liquid-liquid extraction reaction vessel.

* * * * *